United States Patent
Gao et al.

(10) Patent No.: US 12,193,445 B1
(45) Date of Patent: Jan. 14, 2025

(54) PUERARIA LOBATA NANO-SILVER COMPOSITE HYDROSOL, PREPARATION METHOD AND APPLICATION THEREOF

(71) Applicants: Jiangsu Vocational College of Agriculture and Forestry, Jurong (CN); Zhenjiang Zhaolong Agricultural Science and Technology Co., Ltd., Jurong (CN)

(72) Inventors: DaXiang Gao, Jurong (CN); FengTing Liu, Jurong (CN); GangJun Xi, Jurong (CN); Jun Shi, Jurong (CN); JiuLing Ding, Jurong (CN); HeTong Yang, Jurong (CN)

(73) Assignees: Jiangsu Vocational College of Agriculture and Forestry, Jurong (CN); Zhenjiang Zhaolong Agricultural Science and Technology Co., Ltd., Jurong (CN)

( * ) Notice: Subject to any disclaimer, the term of this patent is extended or adjusted under 35 U.S.C. 154(b) by 0 days.

(21) Appl. No.: 18/739,339

(22) Filed: Jun. 11, 2024

(30) Foreign Application Priority Data

Aug. 25, 2023 (CN) .......................... 202311078967.7

(51) Int. Cl.
| | | |
|---|---|---|
| *A01N 65/42* | (2009.01) | |
| *A01G 24/22* | (2018.01) | |
| *A01N 25/04* | (2006.01) | |
| *A01N 25/08* | (2006.01) | |
| *A01N 59/16* | (2006.01) | |
| *A01N 65/20* | (2009.01) | |
| *A01P 3/00* | (2006.01) | |
| *C08J 3/075* | (2006.01) | |

(52) U.S. Cl.
CPC ............. *A01N 65/20* (2013.01); *A01G 24/22* (2018.02); *A01N 59/16* (2013.01); *A01P 3/00* (2021.08); *C08J 3/075* (2013.01)

(58) Field of Classification Search
CPC ............ A01N 65/20; A01N 25/04; B22F 9/24
See application file for complete search history.

(56) References Cited

PUBLICATIONS

Luo et al., Molecules, 2022, 27, 4821, 1-25.*
Satpathy et al., Artificial cells, Nanomedicine and Biotechnology, 46, 71-85.*

* cited by examiner

*Primary Examiner* — Kyle A Purdy

(57) ABSTRACT

A preparation method of a *Pueraria lobata* nano-silver composite hydrosol includes: dispersing *Pueraria lobata* powder in water, then heating to perform gelatinization, then adjusting a pH value, then sequentially adding an alkyl polyglucoside solution, a silver nitrate solution, and a sodium chloride solution, and performing a reaction by microwave heating to obtain the *Pueraria lobata* nano-silver composite hydrosol. The *Pueraria lobata* nano-silver composite hydrosol promotes seed germination of a *Polygonatum* Mill genus, and is applied in antibiotic detection and agricultural sterilization used as a fungicide. Organic solvents, harmful reducing agents, and dispersing agents are completely avoided to be used, and raw materials for preparing the hydrosol are safe and environment-friendly; the preparation method is simple, no harsh conditions are needed, and reaction conditions are mild; a required time is extremely short, energy is saved, consumption is reduced, and a basic principle of green chemistry is completely met.

3 Claims, 5 Drawing Sheets

PUERARIA LOBATA NANO-SILVER COMPOSITE HYDROSOL, PREPARATION METHOD AND APPLICATION THEREOF

CROSS-REFERENCE TO RELATED APPLICATION

This application claims priority to a Chinese patent application No. 202311078967.7, filed to China National Intellectual Property Administration (CNIPA) on Aug. 25, 2023, which is herein incorporated by reference in its entirety.

TECHNICAL FIELD

The present disclosure relates to the technical field of metal-based nanomaterials, particularly to a *Pueraria lobata* nano-silver composite hydrosol, a preparation method and an application thereof.

BACKGROUND

Nano-silver possesses small size effect, surface effect, macroscopic quantum tunneling effect, quantum size effect, etc., that are possessed by the nanomaterials, and can be widely used in various fields, such as antibacterial and deodorizing materials, catalyst materials, antistatic materials, nonlinear optical materials, etc. There are many preparation processes for silver nanoparticles, such as chemical reduction, an electrochemical method, and a microemulsion method. However, there are also some problems existed in the above-mentioned preparation processes. For example, strong reducing agents (such as sodium borohydride, formaldehyde, and hydrazine hydrate, etc.), stabilizers (polyvinyl alcohol abbreviated as PVA, polyvinylpyrrolidone abbreviated as PVP, etc.), and organic solvents are commonly used as raw materials of the chemical reduction. However, these raw materials are expensive and toxic, which can easily cause environmental pollution and cause potential harm to the environment and organisms. At present, green chemistry (also referred to environmentally benign chemistry and environmentally friendly chemistry) has gradually become a mainstream in the technical field of chemistry. Therefore, it is of great significance to prepare a nano-silver material with excellent stability, low cost, and environmental protection, as well as meeting practical application needs.

For green synthesized nanomaterials, a current focus of research is still on the selections of environmentally friendly and cost-effective reaction solvents, reducing agents, and stabilizers, as well as a controllable preparation of nanoparticle size and morphology. Microwave has properties of strong penetration ability and uniform heating. The microwave is applied in the synthesis of nanomaterials, which has advantages of simplicity, speed, and easy nucleation of nano-crystals. The microwave-assisted reduction method has less impact on the environment and consumes much less energy than the traditional methods described above.

Therefore, how to provide a green synthesis method that utilizes microwave-assisted preparation of the nano-silver is an urgent technical problem that those skilled in the related art need to solve.

SUMMARY

In order to solve the above technical problems, an objective of the present disclosure is to provide a *Pueraria lobata* nano-silver composite hydrosol, a preparation method and an application thereof.

In order to achieve the above objective, the present disclosure provides the following technical solutions.

The preparation method of the *Pueraria lobata* nano-silver composite hydrosol includes the following steps:

dispersing *Pueraria lobata* powder in water, heating the *Pueraria lobata* powder and the water to perform gelatinization, thereby obtaining a paste; adjusting a potential of hydrogen (pH) value of the paste, and then sequentially adding an alkyl polyglucoside (APG) solution, a silver nitrate ($AgNO_3$) solution, and a sodium chloride (NaCl) solution into the paste to obtain a mixture, and performing a reaction on the mixture by microwave heating to obtain the *Pueraria lobata* nano-silver composite hydrosol.

Beneficial effects of the present disclosure are as follows. The main component of *Pueraria lobata* in the present disclosure is starch, i.e., a content of the starch in the *Pueraria lobata* is 20% to 25%. The starch in the *Pueraria lobata* has advantages of high paste transparency, high viscosity, and a starch gel is not prone to dehydrate and shrink when frozen. Moreover, the starch in the *Pueraria lobata* has better stability to acids and alkalis than the starch contained in corn and sweet potato. The starch in the *Pueraria lobata* is a high-molecular polymer composed of multiple glucose units and rich in hydroxyl groups. The hydroxyl groups thereof form coordination bonds with silver ions, which can effectively disperse and stabilize the silver nanoparticles. After high-temperature gelatinization of the starch in the *Pueraria lobata*, a certain amount of dextrin and monosaccharides are generated, and the dextrin molecules contain reducing aldehyde groups, providing a guarantee for the synthesis of silver nanoparticles. At the same time, the dextrin molecules are rich in polar hydroxyl groups and ether oxygen groups, electron-rich oxygen atoms of which can coordinate with the silver ions (i.e., $Ag^+$) with positive charges, causing a decrease in the activity of $Ag^+$ and preventing further particle growth. A large number of the hydroxyl groups protect the silver nanoparticles, allowing the silver nanoparticles to stabilize in a small cavity generated by the dextrin molecules.

In addition, the APG in the present disclosure is synthesized from fatty alcohols and glucose under the action of an acidic catalyst, and is a novel non-ionic surfactant with comprehensive performance, exhibiting high surface activity. APG-based surfactants synergistically adsorb and disperse the silver ions (i.e., $Ag^+$) with the dextrin, and can effectively stabilize the silver nanoparticles. The APG can be completely biodegraded without forming difficult to biodegrade metabolites, which is beneficial for environmental protection and is internationally recognized as the preferred "green" functional surfactant.

The present disclosure uses a biosynthetic technology, i.e., using the starch contained in the *Pueraria lobata* and its high-temperature gelatinized product as the stabilizer and the reducing agent to prepare the *Pueraria lobata* nano-silver, which has advantages of easy availability of raw materials, low cost, simple synthesis process, safety and environmental protection, mild reaction conditions, etc., and is suitable for large-scale production. Therefore, the present disclosure has become a promising synthesis method for the nano-silver.

In an embodiment, the heating the *Pueraria lobata* powder and the water to perform gelatinization includes: performing microwave heating on the *Pueraria lobata* powder and the water for 3 minutes (min) to obtain the paste, then taking out the paste and stirring the paste for 10 seconds(s), then continuing the microwave heating for 1.2 min to perform the gelatinization until the paste appears transparent.

A power of the microwave heating in the heating the *Pueraria lobata* powder and the water to perform gelatinization is 800 watts (W) and a temperature for the microwave heating in the heating the *Pueraria lobata* powder and the water to perform gelatinization is 75 degrees Celsius (° C.).

Beneficial effects are as follows. After the microwave heating, the mixed system (i.e., the paste) appears in the transparent dissolved state, and the starch contained in the *Pueraria lobata* is gelatinized into the dextrin and a small amount of glucose.

In an embodiment, the pH value of the paste is adjusted to 13.

Beneficial effects are as follows. The alkaline condition (i.e., the pH value of 13) is beneficial to the formation of silver nanoparticles.

In an embodiment, a ratio of addition amounts of the *Pueraria lobata* powder: the water: the APG solution: the $AgNO_3$ solution: the NaCl solution is in a range of 10 grams (g): (450-550) milliliters (mL): 20 mL: (40-50) mL: (10-15) mL.

Beneficial effects are as follows. The ratio of the addition amounts of the above raw materials is conducive to the formation and stability of silver nanoparticles.

In an embodiment, a concentration of the $AgNO_3$ solution is 40 grams per liter (g/L).

In an embodiment, a concentration of the NaCl solution is 1 g/L.

In an embodiment, the APG solution is obtained by diluting 1 mL of APG0810 (referred to the alkyl polyglucoside with a branched chain of 10 carbons) in 50 mL of water.

In an embodiment, the performing a reaction on the mixture by microwave heating includes: performing the reaction on the mixture for 4 min by the microwave heating, taking out the mixture and stirring the mixture for 10 s, then continuing the microwave heating for 1.1 min to take out the mixture, and standing the mixture for 1-2 h accompanied with intermittently stirring.

In an embodiment, a power of the microwave heating in the performing a reaction on the mixture by microwave heating is 800 W and a temperature for the microwave heating in the performing a reaction on the mixture by microwave heating is 95° C.

Beneficial effects are as follows. After the above microwave heating, the mixed system (i.e., the mixture) in the present disclosure gradually changes from colorless to brownish red. As a time for the microwave heating is extended, the color gradually deepens, indicating the formation and increase in the amount of silver nanoparticles.

A *Pueraria lobata* nano-silver composite hydrosol is prepared by the preparation method of the *Pueraria lobata* nano-silver composite hydrosol as described above.

Beneficial effects are as follows. The *Pueraria lobata* nano-silver particles contained in the *Pueraria lobata* nano-silver composite hydrosol prepared by the present disclosure are quasi spherical, with narrow particle size distribution, high crystallinity, and good stability.

An application of the *Pueraria lobata* nano-silver composite hydrosol includes: applying the *Pueraria lobata* nano-silver composite hydrosol in promoting seed germination of a *Polygonatum* Mill genus.

Beneficial effects are as follows. When a concentration of the *Pueraria lobata* nano-silver particles in a Murashige and Skoog (MS) culture medium added with N-(Phenylmethyl)-9H-purin-6-amine (with a chemical formula of $C_{12}H_{11}N_5$ and abbreviated as 6-BA with a concentration of 0.2 mg/L) and 1-naphthaleneacetic acid (with a chemical formula of $C_{12}H_{10}O_2$ and abbreviated as NAA with a concentration of 0.2 mg/L) is 5.0 mg/L, a germination rate of the corresponding MS culture medium is the highest, reaching 79.6%, rhizome buds therein are dark green, a root system thereof is well developed, small seedlings with 1 to 2 cotyledons are produced therein, and a time for the germination thereof is also the shortest.

An application of the *Pueraria lobata* nano-silver composite hydrosol includes: applying the *Pueraria lobata* nano-silver composite hydrosol in antibiotic detection.

Beneficial effects are as follows. When a residual concentration of tetracycline in the water ranges from 0.1 mg/L to 22 mg/L, there is a well linear relationship between the residual concentration of tetracycline in the water and peak intensity at 1590 centimeters$^{-1}$ (cm$^{-1}$). A linear equation is expressed as follows: Y=218015X+32.49; and a coefficient of determination $R^2$ is 0.99526.

An application of the *Pueraria lobata* nano-silver composite hydrosol includes: applying the *Pueraria lobata* nano-silver composite hydrosol in a fungicide.

Beneficial effects are as follows. The *Pueraria lobata* nano-silver composite hydrosol provided by the present disclosure has bactericidal ability against *Escherichia coli* and *Staphylococcus aureus*. A value of minimum bactericidal concentration (MBC) against the *Escherichia coli* is 10 mg/L, and a value of MBC against the *Staphylococcus aureus* is 320 mg/L.

The present disclosure provides the *Pueraria lobata* nano-silver composite hydrosol and its preparation method and application. The present disclosure uses the starch contained in the *Pueraria lobata* and the APG as the main stabilizer and surfactant to reduce the surface activity of silver particles, make the silver particles less prone to aggregation, and improve the stability of silver nanoparticles. The dextrin and monosaccharides generated by the gelatinization are used as reducing agents to synthesize the silver nanoparticles by using a cheap and environmentally friendly microwave radiation heating mode. The present disclosure completely avoids using organic solvents, harmful reducing agents, and dispersants, and the raw materials for preparing the *Pueraria lobata* nano-silver composite hydrosol are safe and environmentally friendly. The preparation method is simple, does not require harsh conditions, and the reaction conditions thereof are mild. Moreover, the preparation method requires an extremely short time, is energy-saving and consumption-reducing, which is fully in line with the basic principles of green chemistry.

In addition, through transmission electron microscope (TEM) testing, the silver nanoparticles in the *Pueraria lobata* nano-silver composite hydrosol synthesized by the present disclosure are quasi spherical and have high crystallinity, with an average particle size of about 24.5 nanometers (nm), can be evenly dispersed in the water, are negatively charged, and have high stability. Moreover, the silver nanoparticles are not prone to agglomeration, have no precipitation occurred after placing for 30 days (d) at room temperature. In addition, the *Pueraria lobata* nano-silver composite hydrosol prepared in the present disclosure has strong bactericidal properties against the *Escherichia coli* and the *Staphylococcus aureus*, has a surface-enhanced Raman scattering effect on tetracycline solutions with different concentrations, and has significant growth-promoting effects on the seed germination of the *Polygonatum* Mill genus. Therefore, the *Pueraria lobata* nano-silver composite hydrosol has great application potential in agricultural production for sterilization, antibiotic detection, and seed germination of the *Polygonatum* Mill genus.

BRIEF DESCRIPTION OF DRAWING

Attached drawings that form a part of the present disclosure are used to provide a further understanding of the present disclosure. Illustrated embodiments of the present disclosure and descriptions thereof are used to explain the present disclosure and do not constitute an improper limitation of the present disclosure.

FIG. 7A illustrates processing No. 1, FIG. 7B illustrates processing No. 2, and FIG. 7C illustrates processing No. 3.

DETAILED DESCRIPTION OF EMBODIMENTS

The technical solutions in the embodiments of the present disclosure will be clearly and completely described below with reference to the attached drawings in the embodiments of the present disclosure. Apparently, the described embodiments are only parts, not all, of the embodiments of the present disclosure. Based on the embodiments of the present disclosure, all other embodiments obtained by those skilled in the related art without creative efforts fall within the scope of the protection of the present disclosure.

In order to make the above objectives, features and advantages of the present disclosure more obvious and understandable, the present disclosure will be described in further detail below with reference to the attached drawings and the illustrated embodiments.

Raw materials used in the embodiments of the present disclosure are all purchased from commercial sources.

Embodiment 1

A preparation method of a *Pueraria lobata* nano-silver composite hydrosol includes the following steps.

10 g of *Pueraria lobata* powder is weighed and placed in a 1 liter (L) large beaker, 500 mL of deionized water is added into the beaker and the *Pueraria lobata* powder is added into the deionized water accompanied with mixing evenly, the *Pueraria lobata* powder added with the deionized water is placed in a microwave oven, microwave heating is performed for 3 min at 800 W, thereby obtaining a paste, the paste is taken out and is stirred with a glass rod for 10 s, and then the paste is performed gelatinization by the microwave heating for 1.2 min at 800 W until the paste appears transparent. Thereafter, the transparent paste is taken out, and is quickly cooled down to 35° C. with cold water to obtain a cooled paste, and a pH value of the cooled paste is adjusted to 13 by using a potassium hydroxide (KOH) solution or a sodium hydroxide (NaOH) solution. Moreover, 20 mL of an APG0810 solution with a dilution ratio of 1:50 (V: V), 50 mL of $AgNO_3$ solution with a concentration of 40 g/L, and 15 mL of NaCl solution with a concentration of 1 g/L are added into the cooled paste to obtain a mixture. The mixture is mixed evenly and quickly placed in a microwave oven, first microwave heating is performed on the mixture for 4 min at 800 W, and then is stirred with a glass rod for 10 s, then the microwave heating is performed again for 1.1 min at 800 W, the mixture is taken out and naturally stood for 1-2 h accompanied with intermittently stirring by using the glass rod, and finally the *Pueraria lobata* nano-silver composite hydrosol is obtained.

Technical effects are as follows.

1. Structural Characterization

Figure 1:
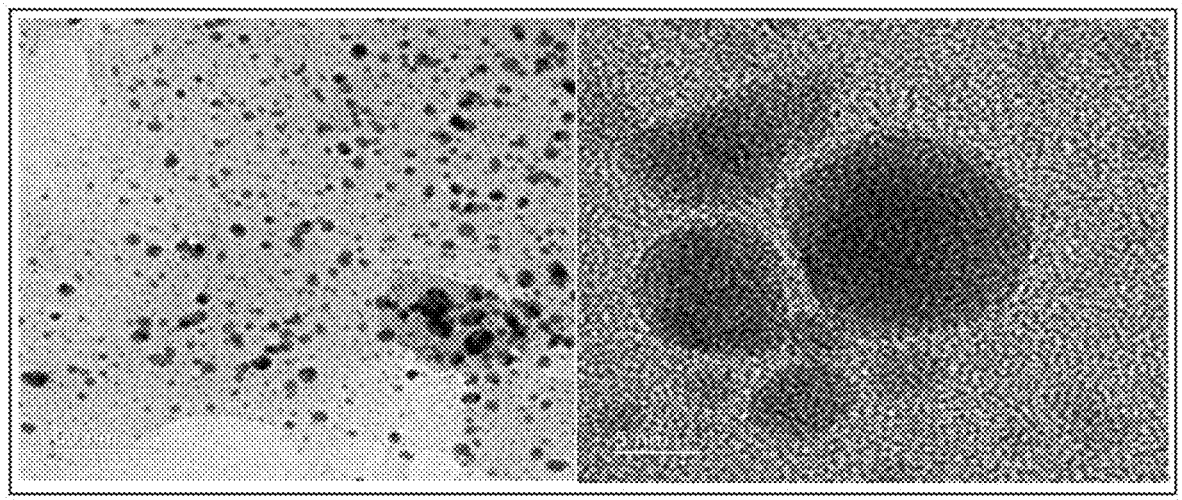
FIG. 1 illustrates a photograph of a *Pueraria lobata* nano-silver composite hydrosol by using transmission electron microscope (TEM) according to an embodiment 1 of the present disclosure.

FIG. 1 illustrates morphology of the *Pueraria lobata* nano-silver composite hydrosol observed with the TEM. It can be seen that the *Pueraria lobata* nano-silver particles contained in the prepared *Pueraria lobata* nano-silver composite hydrosol are all quasi spherical and have relatively narrow particle size distribution that is mainly distributed between 24 nm and 25 nm.

Figure 2:
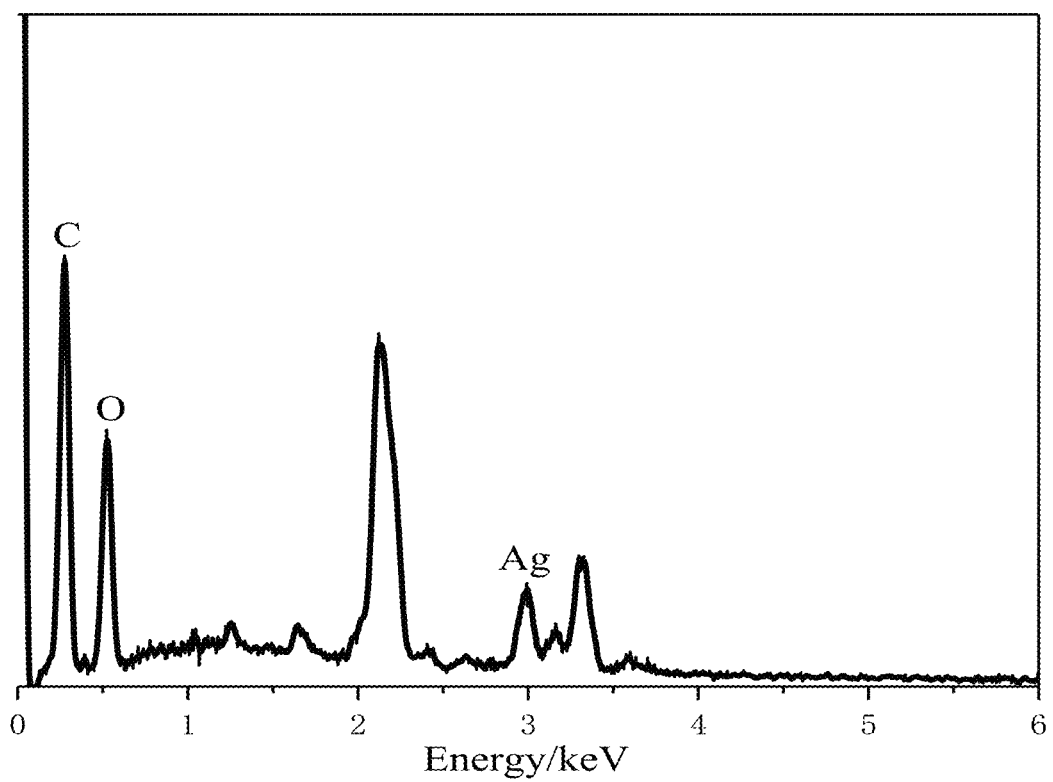
FIG. 2 illustrates a spectrum of the *Pueraria lobata* nano-silver composite hydrosol by using energy dispersive spectrometer (EDS) according to the embodiment 1 of the present disclosure.

FIG. 2 illustrates the spectrum of silver nanoparticles by using the EDS. It can be seen that the obtained *Pueraria lobata* nano-silver composite hydrosol contains elements, e.g., carbon (C), oxygen (O), and Ag, among which C and O are components of the starch contained in the *Pueraria lobata*. This result confirms that the silver nanoparticles exist in the nano composite material (i.e., the *Pueraria lobata* nano-silver composite hydrosol).

Figure 3:
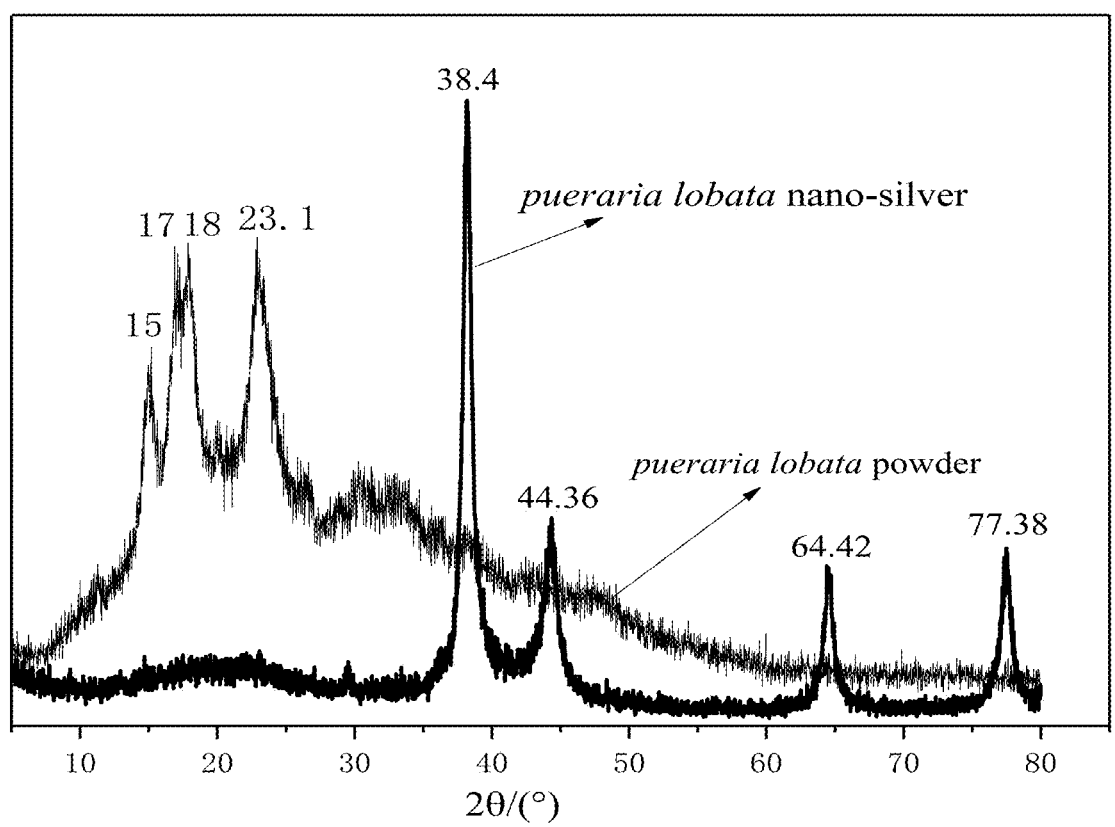
FIG. 3 illustrates a spectrum of the *Pueraria lobata* nano-silver composite hydrosol by using X-ray diffraction (XRD) according to the embodiment 1 of the present disclosure.

FIG. 3 illustrates the spectrum of the *Pueraria lobata* nano-silver composite hydrosol by using the XRD. It can be seen that four diffraction peaks located at 2θ=38.4°, 44.36°, 64.42°, and 77.38° can be attributed to crystal planes i.e., (111), (200), (220), and (311) of the nano-silver particles respectively (with reference to joint committee on powder diffraction standards abbreviated as JCPDS No. 04-0783). Therefore, the synthesized *Pueraria lobata* nano-silver particles have a face-centered cubic (FCC) structure. Specially, the 4 diffraction peaks are sharp, indicating that the synthesized *Pueraria lobata* nano-silver particles have high crystallinity.

Figure 4A:
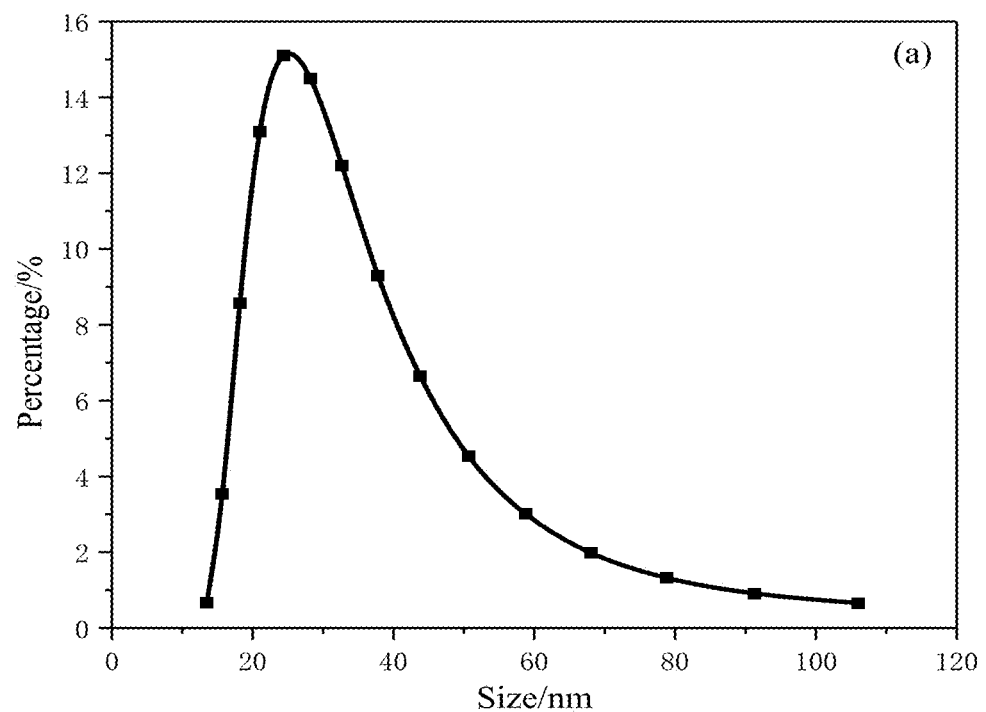
FIG. 4A illustrates an average particle size of the *Pueraria lobata* nano-silver composite hydrosol according to the embodiment 1 of the present disclosure.
Figure 4B:
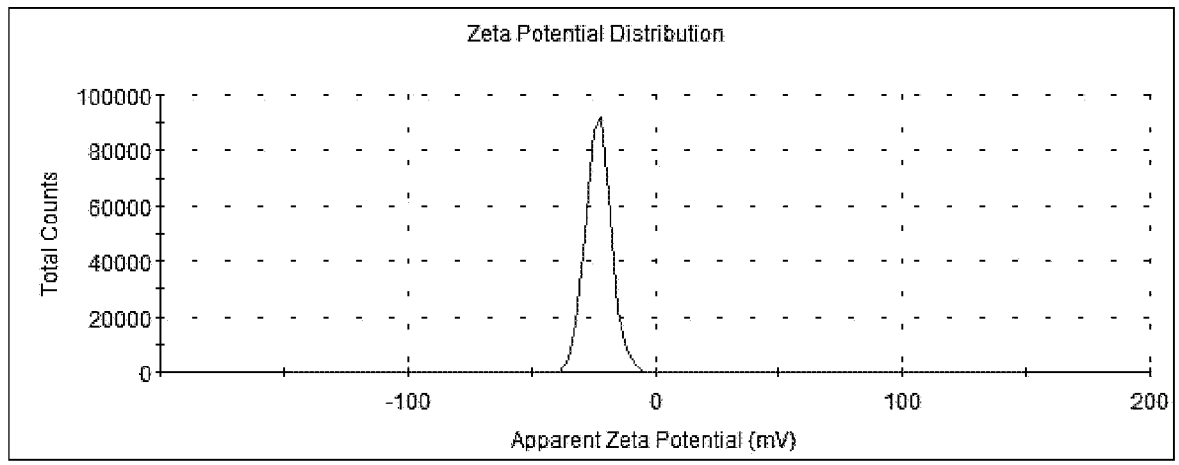
FIG. 4B illustrates Zeta potential of the *Pueraria lobata* nano-silver composite hydrosol according to the embodiment 1 of the present disclosure.

FIG. 4A illustrates the average particle size of the *Pueraria lobata* nano-silver composite hydrosol and FIG. 4B illustrates the Zeta potential of the *Pueraria lobata* nano-silver composite hydrosol. It can be seen that the average particle size of the *Pueraria lobata* nano-silver particles is 24.5 nm and the Zeta potential is $-10.2$ millivolts (mV), indicating that the substances adsorbed on the surface of the obtained *Pueraria lobata* nano-silver particles have negative charges. These substances may be alkaloids, flavonoids, polysaccharides, proteins, etc. mixed in the *Pueraria lobata* nano-silver particles during the preparation process of the starch contained in the *Pueraria lobata*. It is precisely due to the electrostatic repulsion between the negative charges on the surface of the *Pueraria lobata* nano-silver particles that the obtained nano-silver material is less prone to agglomeration.

Figure 5:
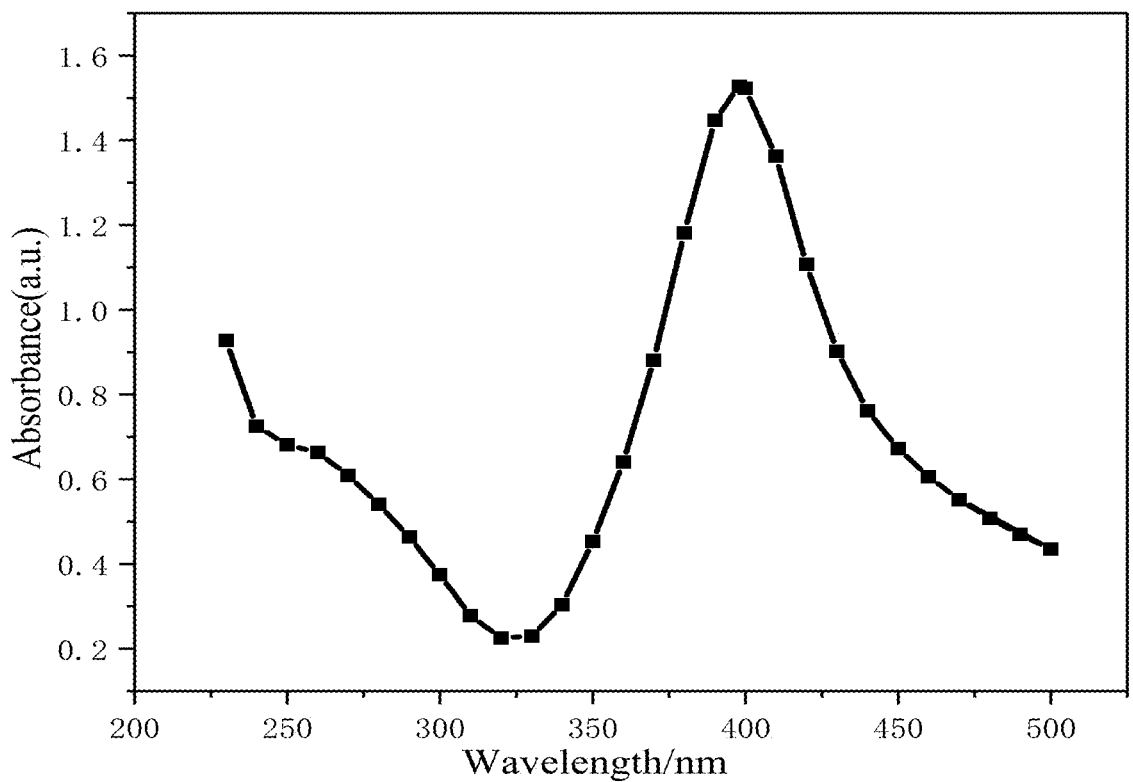
FIG. 5 illustrates an ultraviolet-visible (UV-vis) absorption spectrum of the *Pueraria lobata* nano-silver composite hydrosol according to the embodiment 1 of the present disclosure.

FIG. 5 illustrates the UV-vis absorption spectrum of the *Pueraria lobata* nano-silver composite hydrosol (i.e., illustrated as absorbance). It can be seen that the *Pueraria lobata* nano-silver composite hydrosol has a strong absorption peak at 396.7 nm, indicating that the prepared the *Pueraria lobata* nano-silver composite hydrosol has an obvious quantum size effect, which is due to the absorption caused by surface plasmon resonance effect of the nano-silver particles. According to the Mie theory, a single surface plasmon resonance band shows that the synthesized *Pueraria lobata* nano-silver particles are mainly spherical. Moreover, a absorption band appearing at UV 396.7 nm of the *Pueraria lobata* nano-silver particles is in a relatively narrow wavelength range, indicating that the particle size range of the *Pueraria lobata* nano-silver particles is relatively small, which is consistent with the TEM detection result.

2. Stability Test 50 mL of the *Pueraria lobata* nano-silver composite hydrosol prepared in the embodiment 1 is added into a 150 mL Erlenmeyer flask, and then the Erlenmeyer flask added with the *Pueraria lobata* nano-silver composite hydrosol is placed in a 30° C. constant-temperature incubator for 10 d, 20 d and 30 d respectively to investigate the stability of the *Pueraria lobata* nano-silver composite hydrosol in the practical application, results of which are shown in the following Table 1.

TABLE 1

Stability of the *Pueraria lobata* nano-silver composite hydrosol under different standing times

| Number | Standing time (d) | Optical density (OD) peak | Wavelength corresponding to peak (λ) |
|---|---|---|---|
| 1 | 0 | 1.480 | 409.8 |
| 2 | 10 | 1.488 | 407.8 |
| 3 | 20 | 1.499 | 406.4 |
| 4 | 30 | 1.604 | 406.8 |

As can be seen from Table 1, within 30 d, the absorption band of the *Pueraria lobata* nano-silver composite hydrosol in the UV-vis absorption spectrum has no significant variations, indicating that the *Pueraria lobata* nano-silver composite hydrosol has good stability. Moreover, when left for 30 d, compared with the newly prepared *Pueraria lobata* nano-silver composite hydrosol, the absorption peak of the *Pueraria lobata* nano-silver composite hydrosol left for 30 d is increased, indicating that the amount of *Pueraria lobata* nano-silver particles is further increased during the placement process.

3. Bactericidal Property Test

After streaking test strains of *Escherichia coli* and *Staphylococcus aureus* on nutrient broth (NB) plates respectively, the NB plates are cultured in a constant temperature incubator at 37° C. until the NB plates clearly appear bacterial plaques. An appropriate amount of mature colonies in the bacterial plaques is selected respectively, and then the mature colonies are added to a 3 mL NB liquid culture medium, followed by mixing well, and the mature colonies are cultured in the constant temperature incubator at 37° C. for $10^{-15}$ h until an OD600 value is about 0.5. Thereafter, *Escherichia coli* bacterial solution cultured by the NB liquid and the *Pueraria lobata* nano-silver composite hydrosol obtained in the embodiment 1 are used to prepare the *Escherichia coli* bacterial solutions containing *Pueraria lobata* nano-silver particles with final concentrations of 5 mg/L, 10 mg/L, and 20 mg/L respectively. Meanwhile, *Staphylococcus aureus* bacterial solution cultured by the NB liquid and the *Pueraria lobata* nano-silver composite hydrosol obtained in the embodiment 1 are used to prepare the *Staphylococcus aureus* bacterial solutions containing *Pueraria lobata* nano-silver particles with final concentrations of 80 mg/L, 160 mg/L, 320 mg/L, and 640 mg/L. And then, 100 microliters (μL) of the *Escherichia coli* bacterial solutions and the *Staphylococcus aureus* bacterial solutions are obtained respectively to smear on the NB plates, the NB plates are incubated at 37° C. for $10^{-15}$ h, and then the NB plates are taken photos and counted.

TABLE 2 illustrates the bactericidal properties of the *Pueraria lobata* nano-silver composite hydrosol.

| Bacteria | Nano-silver particle concentration (mg/L) | Number of CFU (count) |
|---|---|---|
| *Escherichia coli* | 5 | 1282 |
| *Escherichia coli* | 10 | 9 |
| *Escherichia coli* | 20 | 6 |
| *Staphylococcus aureus* | 80 | 2816 |
| *Staphylococcus aureus* | 160 | 263 |
| *Staphylococcus aureus* | 320 | 7 |
| *Staphylococcus aureus* | 640 | 3 |

The results in Table 2 show that the *Pueraria lobata* nano-silver composite hydrosol prepared in the embodiment 1 of the present disclosure has bactericidal ability against the *Escherichia coli* and the *Staphylococcus aureus*. The MBC value against the *Escherichia coli* is 10 mg/L, and the MBC value against the *Staphylococcus aureus* is 320 mg/L. Among them, the MBC value represents the minimum bactericidal concentration, that is, the minimum concentration of *Pueraria lobata* nano-silver particles required to kill 99.9% (a reduction of 3 orders of magnitude) of the tested microorganisms.

4. Tetracycline Detection and Verification

Tetracycline (with a chemical formula of $C_{22}H_{24}N_2O_8$) solutions with different concentrations (i.e., 5×10–6 mole per liter abbreviated as mol/L, 5×10-5 mol/L, 5×10-4 mol/L, 2.5×10-4 mol/L, and 1×10-4 mol/L) are prepared. Then, 1 mL of the tetracycline solutions with different concentrations is obtained respectively, and then is evenly mixed with the *Pueraria lobata* nano-silver composite hydrosol prepared in the embodiment of the present disclosure in equal volumes. Thereafter, a Raman spectrometer is used to test, an excitation wavelength is set to 785 nm, an output power is set to 300 megawatts (mW), and test samples at 100~2,000 $cm^{-1}$ of the Raman spectrum are collected.

Figure 6:
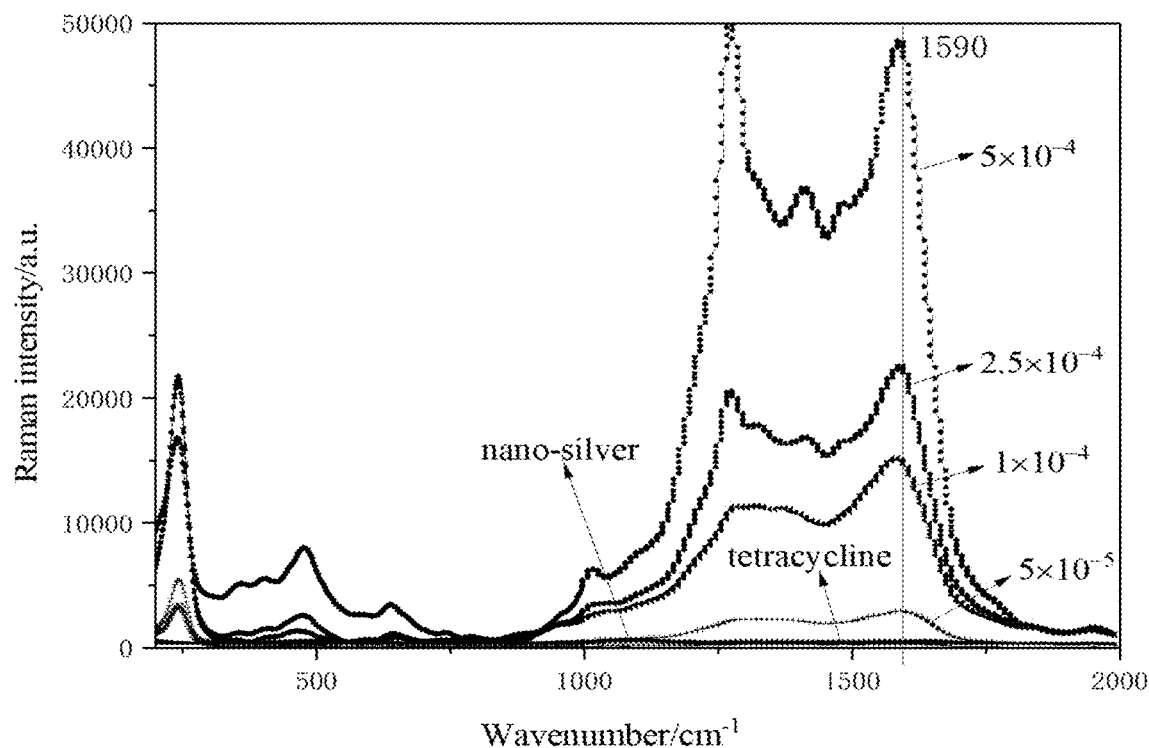
FIG. 6 illustrates a detection of tetracycline by surface-enhanced Raman spectroscopy (SERS) of the *Pueraria lobata* nano-silver composite hydrosol according to the embodiment 1 of the present disclosure.

FIG. 6 illustrates the SERS diagram of the *Pueraria lobata* nano-silver composite hydrosol. The results show that when the residual concentration of tetracycline in the water ranges from 0.1 mg/L to 22 mg/L, there is a well linear relationship between the residual concentration of tetracycline in the water and the peak intensity at 1590 $cm^{-1}$. The linear equation is expressed as follows: Y=218015X+32.49; and the coefficient of determination $R^2$ is 0.99526. Therefore, the *Pueraria lobata* nano-silver composite hydrosol obtained by the present disclosure can meet the requirements for the detection of tetracycline residues in water, laying a good foundation for on-site rapid detection of tetracycline residues in the water.

5. Detection on Promotion of Seed Germination of *Polygonatum* Mill Genus

Figure 7A:
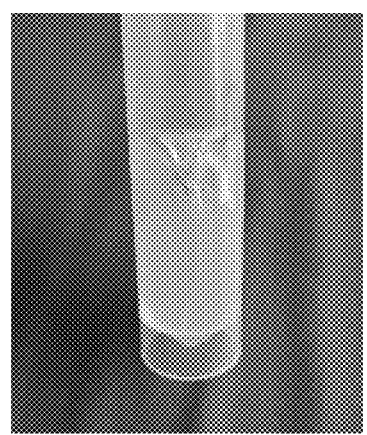
FIGS. 7A-7C illustrate effects of the *Pueraria lobata* nano-silver composite hydrosol according to the embodiment 1 of the present disclosure with different concentrations on seed germination of a *Polygonatum* Mill genus, where
Figure 7B:
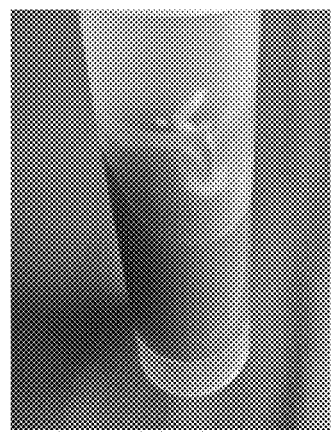
Figure 7C:
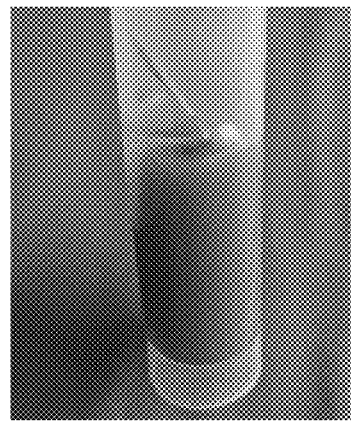

The MS (containing sucrose and agar) culture medium (also referred to a basal medium) is added with 0.2 mg/L of 6-BA and 0.2 mg/L of NAA, and then the MS culture medium is added with the *Pueraria lobata* nano-silver composite hydrosol obtained in the embodiment 1. Moreover, seeds of the *Polygonatum* Mill genus stored by sand storage at 4° C. for 30 d are selected to perform seed germination test to observe and compare the effects of *Pueraria lobata* nano-silver composite hydrosol on the germination of the seeds of the *Polygonatum* Mill genus. After inoculation, a time for the seed germination, growth vigor, and a germination rate are observed and compared. Specially, the germination rate (%)=total number of germinations/number of test seeds×100%. The details of different treatments are shown in the following Table 3, and the results are shown in Table 4 and FIGS. 7A-7C. Among them, FIG. 7A illustrates processing No. 1, FIG. 7B illustrates processing No. 2, and FIG. 7C illustrates processing No. 3.

TABLE 3

Composition of culture medium with different concentrations of *Pueraria lobata* nano-silver particles

| Number | Basal medium | 6-BA (mg/L) | NAA (mg/L) | Pueraria lobata nano-silver particles (mg/L) |
|---|---|---|---|---|
| 0 | MS | 0.2 | 0.2 | 0 |
| 1 | MS | 0.2 | 0.2 | 2 |
| 2 | MS | 0.2 | 0.2 | 5 |
| 3 | MS | 0.2 | 0.2 | 10 |

TABLE 4 illustrates the effects of different concentrations of *Pueraria lobata* nano-silver particles on the germination of the seeds of the *Polygonatum* Mill genus.

| Number | Germination star-up time (d) | Growth vigor | Germination percentage (%) |
|---|---|---|---|
| 0 | 28 | Few green and major yellowish | 42.8 ± 2.6a |
| 1 | 10 | dark green and partial yellowish | 74.8 ± 4.3bc |
| 2 | 6 | Dense green | 79.6 ± 3.7c |
| 3 | 12 | Yellowish | 67.8 ± 2.4d |

It is noted that different uppercase and lowercase letters indicate a significant level of 0.05.

It can be seen that after 60 days of culture, most of the seeds germinate into stem and root buds. Among them, the No. 2 MS medium with 6-BA (0.2 mg/L) and NAA (0.2 mg/L) that is added with 5.0 mg/L of the *Pueraria lobata* nano-silver has the highest germination rate, reaching 79.6%. Moreover, the rhizome buds are dark green, the root system is developed, and small seedlings with 1 to 2 cotyledons are grown. The start-up germination time is also the shortest. Germination can be seen about 6 d after inoculation. The No. 0 MS medium is used as a control group, which has the lowest germination rate and the longest time to start up the germination. Germination in the No. 0 MS medium occurs after 28 d of the inoculation. The rhizome buds are green and some are yellowish.

The above description is only used to describe the illustrated embodiments of the present disclosure, but the scope of the protection of the present disclosure is not limited thereto. Those skilled familiar with the technical field can easily think of changes or substitutions within the technical scope disclosed in the present disclosure. All of the changes or the substitutions are covered by the scope of the protection of the present disclosure. Therefore, the scope of the protection of the present disclosure should be subject to the disclosure.

What is claimed is:

1. A preparation method of a *Pueraria lobata* nano-silver composite hydrosol, comprising the following steps:
   dispersing *Pueraria lobata* powder in water, heating the *Pueraria lobata* powder and the water to perform gelatinization, thereby obtaining a paste; adjusting a potential of hydrogen (pH) value of the paste, and then sequentially adding an alkyl polyglucoside solution, a silver nitrate solution, and a sodium chloride solution into the paste to obtain a mixture, and performing a reaction on the mixture by microwave heating to obtain the *Pueraria lobata* nano-silver composite hydrosol;
   wherein the pH value of the paste is adjusted to 13;
   wherein a ratio of addition amounts of the *Pueraria lobata* powder: the water: the alkyl polyglucoside solution: the silver nitrate solution: the sodium chloride solution is in a range of 10 grams (g): 450-550 milliliters (mL): 20 mL: 40-50 mL: $10^{-15}$ ml;
   wherein a concentration of the silver nitrate solution is 40 grams per liter (g/L);
   wherein a concentration of the sodium chloride solution is 1 g/L;
   wherein the alkyl polyglucoside solution is obtained by diluting 1 mL of alkyl polyglucoside with a branched chain of 10 carbons in 50 ml of water;
   wherein the performing a reaction on the mixture by microwave heating comprises: performing the reaction on the mixture for 4 minutes (min) by the microwave heating, taking out the mixture and stirring the mixture for 10 seconds(s), then continuing the microwave heating for 1.1 min, taking out the mixture, and standing the mixture for 1-2 h accompanied with intermittent stirring; and
   wherein a power of the microwave heating in the performing a reaction on the mixture by microwave heating is 800 watts (W), and a temperature for the microwave heating is 95 degrees Celsius (° C.).

2. The preparation method of the *Pueraria lobata* nano-silver composite hydrosol according to claim 1, wherein the heating the *Pueraria lobata* powder and the water to perform gelatinization comprises: performing microwave heating on the *Pueraria lobata* powder and the water for 3 min to obtain the paste, then taking out the paste and stirring the paste for 10 s, then continuing the microwave heating for 1.2 min to perform the gelatinization until the paste appears transparent; and
   wherein a power of the microwave heating in the heating the *Pueraria lobata* powder and the water to perform gelatinization is 800 W, and a temperature for the microwave heating in the heating the *Pueraria lobata* powder and the water to perform gelatinization is 75° C.

3. A *Pueraria lobata* nano-silver composite hydrosol, wherein the *Pueraria lobata* nano-silver composite hydrosol is prepared by the preparation method of the *Pueraria lobata* nano-silver composite hydrosol according to claim 1.

\* \* \* \* \*